March 23, 1965   J. C. FLYNN   3,174,637
APPARATUS FOR PLACING ROWS OF ARTICLES ON CONVEYORS
Filed July 26, 1962
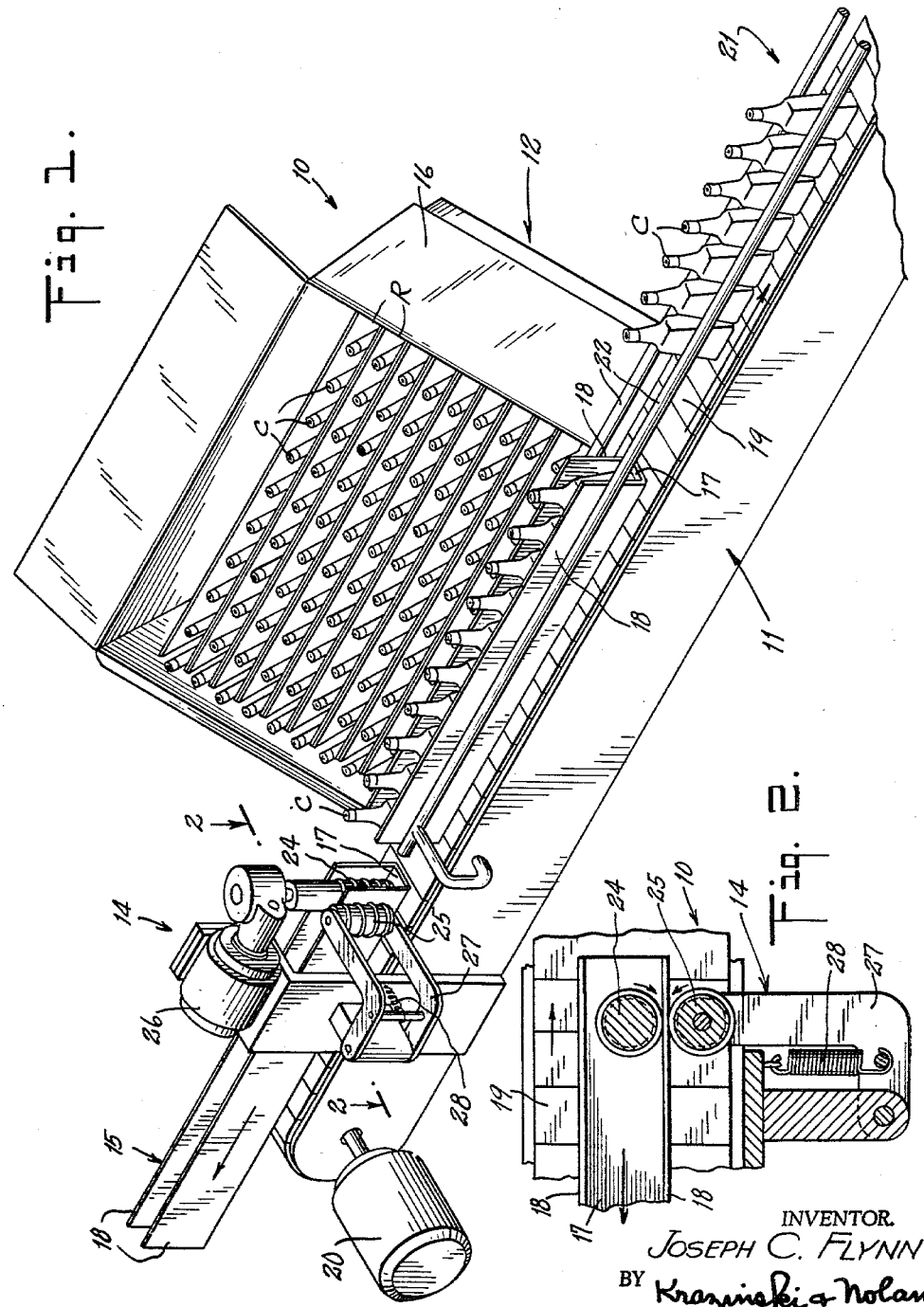
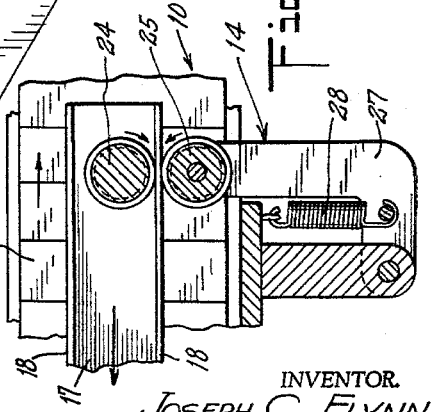
INVENTOR.
JOSEPH C. FLYNN
BY Krazinski & Nolan
ATTORNEYS

United States Patent Office 3,174,637
Patented Mar. 23, 1965

3,174,637
APPARATUS FOR PLACING ROWS OF
ARTICLES ON CONVEYORS
Joseph C. Flynn, Vineland, N.J., assignor to General
Mold & Machinery Corporation, Millville, N.J., a corporation of New Jersey
Filed July 26, 1962, Ser. No. 212,600
5 Claims. (Cl. 214—310)

The present invention relates to article handling and conveying apparatus and, more particularly, to apparatus for unpacking articles, such as containers, and placing rows of the containers on a conveyor for delivery to an automatic filling and sealing machine.

Heretofore, many problems have existed in packing, unpacking and placing topheavy or otherwise unstable containers on conveyors. This is particularly so in the handling of empty lightweight plastic resin containers which are becoming ever increasingly more popular. Such containers by reason of their construction or ornamental configuration lack stability. As a result of these difficulties systems for conveying such containers to automatic filling machinery capable of being operated at high speed are slowed down considerably, whereby the efficiency of the filling machinery is reduced to a point that the filling operation cost is materially increased. Also, in handling such containers and supervising the machinery, which is utilized, labor costs are increased.

Accordingly, an object of the present invention is to provide apparatus which overcomes the foregoing difficulties and problems in a simple, practical and economical manner.

Another object is to provide such apparatus and a container packing arrangement for use with the apparatus which facilitate unpacking the containers from a shipping carton and placing the containers on the conveyor with the apparatus functioning to separate the containers and the packing arrangement means and to convey the containers to automatic filling machinery.

Another object is to provide such apparatus and packing arrangement which enables a single operator to readily feed containers to the apparatus to satisfy the demand of the filling machine for containers when operated at full speed.

A further object is to provide such apparatus which can be applied to any conveyor system for handling containers.

Other and further objects will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein:

FIG. 1 is a perspective view of a conveyor equipped with apparatus in accordance with the present invention and the packing arrangement of the containers for use with the apparatus.

FIG. 2 is a sectional view taken along the line 2—2 on FIG. 1.

Referring now to the drawing in detail, there is shown a system for unpacking containers and delivering the containers to a filling machine (not shown) or other work station. This system generally comprises a package 10 including a container packing and removing arrangement for handling containers C in the system, a conveyor 11 on which the containers removed from the package are placed, a bracket 12 for supporting the package 10 adjacent the conveyor 11, and mechanism 14 for separating the containers from a container packing and handling member 15 in the manner about to be described.

The package 10 comprises a rectangular box or carton 16, a group of channel-shaped trough members 15 positioned side by side in the box 16, each member 15 having a bottom wall 17 and a pair of side walls 18 extending upwardly from the side edges of the bottom wall 17, and a row R of upright containers C supported on each of the bottom walls between a pair of side walls. The containers C shown herein may be fabricated from plastic resin and thus are unbreakable in the sense that glass containers are breakable. It is thus permissible to place adjacent containers in contact with each other as shown.

The conveyor 11 may be any conventional type including an endless conveyor member passing over rotatable means at each end and having an upper strand 19 for supporting containers C thereon for delivery to the filling machine, motor means 20 for driving the conveyor to move the strand 19 from left to right, as indicated by the arrow, and lengthwise extending guide means 21, such as a pair of spaced apart parallel rails or bars 22 above and adjacent the strand 19 for guiding the containers C and trough members 15 therebetween, as described hereinafter.

The bracket 12 is mounted adjacent the conveyor 11 at one side thereof and is disposed upwardly and outwardly from the conveyor to support the box 16 in an inclined position to facilitate removing the trough members 15 from the box in a convenient manner and placing the trough members one by one between the rails 22 of the guide means with a row of containers on each trough member.

The container and trough member separating mechanism 14 generally comprises means for engaging the trough members and moving the same from right to left, as indicated by the arrow, that is, in the opposite direction in which the conveyor strand 19 is moving, and for preventing movement of the rows of containers with the trough members, whereby the trough members are slid from under the rows of articles to place the articles on the conveyor strand for movement with the conveyor strand and delivery to the filling machine.

In the illustrative embodiment disclosed herein, such mechanism comprises a pair of upright rolls 24 and 25 providing a nip therebetween for one of the side walls 18 of the trough members 15, and motor means 26 for driving at least one of the rolls to move the trough members from right to left. The roll 24, as shown herein, is the driven roll and is positioned with its axis of rotation substantially in the same vertical plane in which the midpoint between the guide rails 22 is located, so that the side walls 18 of the trough members straddle the roll 24 and this roll serves as a stop to prevent right to left movement of the containers with the trough member on which they are supported. The roll 25 serves as an idler roll and is mounted on a bracket 27 provided with a spring 28 for urging the roll 25 towards roll 24 to provide the nip for receiving the side walls 18 of the trough members 15.

In operation of the system, as shown in FIG. 1, two trough members 15 with a row of containers C have been removed from the box 16. The first trough member removed from the box is on its way to be discharged for future use and the row of containers which were supported thereon are on the conveyor strand at the right for delivery to the filling machine. The second trough member with a row of containers thereon, removed from the box, is shown just after being placed on the conveyor strand 19 and between the rails 22.

Removal, unpacking or separation of the containers C from the last mentioned trough member 15 is effected by sliding or nudging this trough member towards the left, so that one of its side walls 18 enters the nip provided by the rolls 24 and 25 and the rolls move this trough member quickly towards the left with the container at the left end of the row of containers in this trough member being restrained from right to left movement by the roll 24. As this trough member continues to be moved from right to left its bottom wall is slid from under the row of containers thereon, whereby this row of containers is placed on the conveyor strand 19 for movement from left to right towards the filling machine.

In practice, it has been found that a wide variety of shapes and sizes of containers can be unpacked at the rate of two hundred per minute or more to satisfy the demand of automatic filling machinery or other equipment operated at its maximum speed.

From the foregoing description, it will be seen that the present invention provides a simple, practical and economical system for handling unstable containers in a rapid manner without upsetting the containers or otherwise causing delays in their delivery to a work station.

As various changes may be made in the form, construction, and arrangement of the parts herein, without departing from the spirit and scope of the invention and without sacrificing any of its advantages, it is to be understood that all matters are to be interpreted as illustrative and not in any limiting sense.

What is claimed is:

1. In apparatus for unpacking containers, the combination of an elongate trough including a bottom wall and a pair of spaced apart parallel upright side walls for supporting a row of containers in upright position, a conveyor having a strand for supporting said trough and the containers thereon, lengthwise extending guide means adjacent said strand for guiding said trough and the containers, means including a pair of rolls for engaging opposite sides of one of said walls of said trough and moving the same towards one end of said conveyor to remove said trough from said strand and for preventing movement of the row of containers with said trough, whereby said bottom wall is slid from under the containers to place the containers on said conveyor strand, and means for driving said conveyor to move said strand in the opposite direction said trough is moved to deliver the bottles to the other end of said conveyor.

2. In apparatus according to claim 1, wherein said rolls are mounted in upright position for engaging a side wall of said trough and one of said rolls is positioned between the side walls of said trough and for engagement by a container at the end of a row to prevent movement of the row of containers with said trough.

3. In apparatus according to claim 2, wherein one of said rolls is driven, the other of said rolls is an idler roll, and spring means are arranged for urging said idler roll towards the driven roll to provide a nip between said rolls.

4. In apparatus according to claim 3, wherein said driven roll is positioned between said side walls of said trough.

5. Apparatus of the class described comprising a conveyor having a substantially horizontal strand, lengthwise extending spaced apart parallel guide bars adjacent and above said strand, a pair of rolls providing a nip for receiving an elongate member on said strand therebetween, said rolls being mounted in upright position with one of said rolls being driven and having its axis of rotation substantially at the midpoint between the sides of said guide means and said other roll being an idler roll, spring means arranged to urge said idler roll towards said driven roll, means for operating said rolls to move the elongate member in one lengthwise direction, and means for driving said conveyor to move the strand in the opposite direction.

References Cited by the Examiner
UNITED STATES PATENTS

| 1,112,816 | 10/14 | Manchester | 214—310 X |
| 1,810,619 | 6/31 | Oslund | 198—167 X |
| 1,952,071 | 3/34 | Hunter | 206—65 |
| 2,098,611 | 11/37 | Borchert | 206—65 |
| 2,625,284 | 1/53 | Atwood | 214—310 |
| 2,877,883 | 3/59 | Lanham | 198—30 X |
| 2,935,216 | 5/60 | Patt | 214—310 |
| 2,941,654 | 6/60 | Falconer | 198—161 X |
| 3,062,395 | 11/62 | Behling | 214—310 |

HUGO O. SCHULZ, *Primary Examiner.*

ERNEST A. FALLER, Jr., GERALD M. FORLENZA,
*Examiners.*